Figure 1:
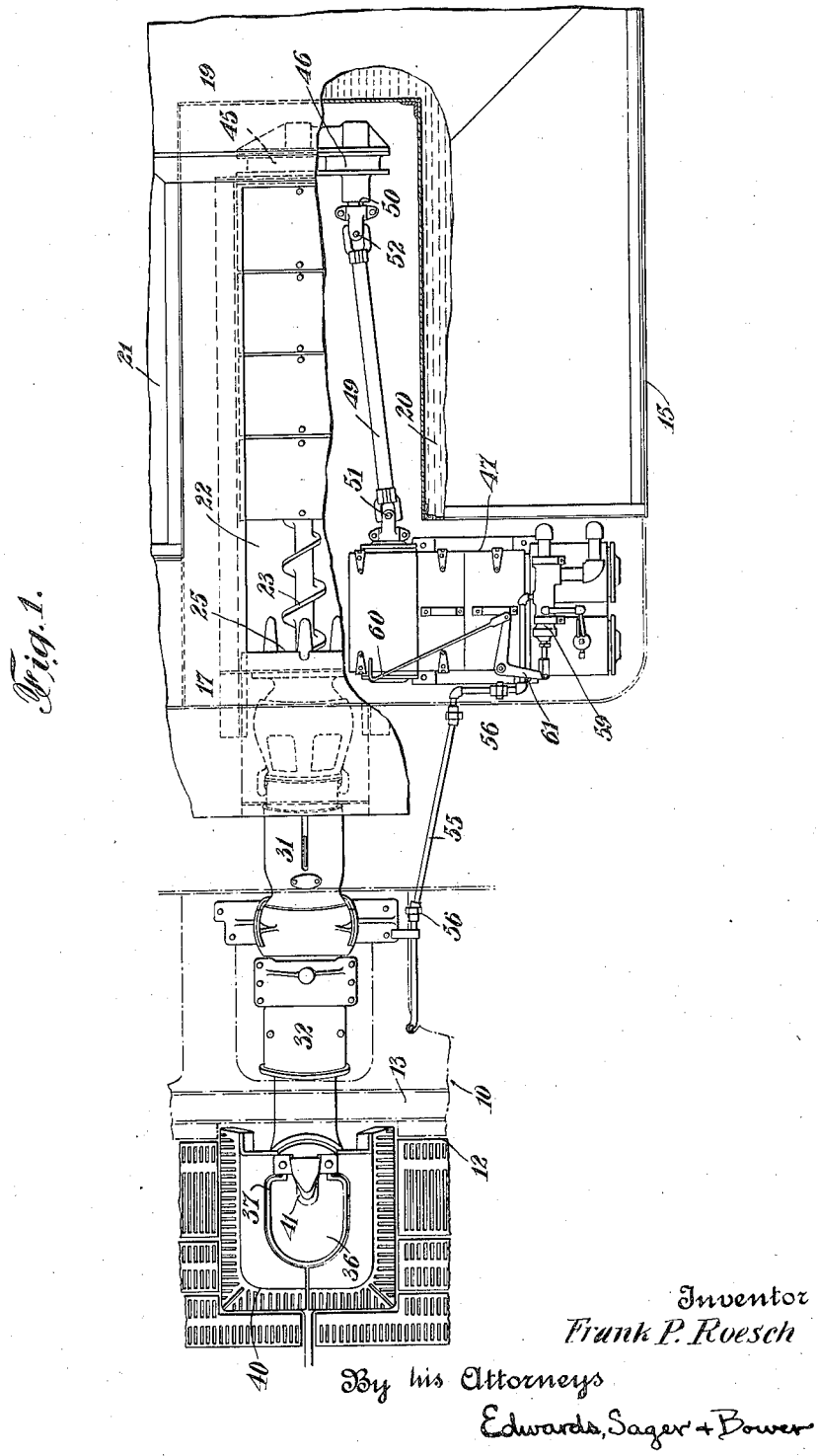

April 14, 1931.  F. P. ROESCH  1,800,407
STOKER
Filed Dec. 17, 1925   2 Sheets-Sheet 1

Inventor
Frank P. Roesch
By his Attorneys
Edwards, Sager + Bower

April 14, 1931.  F. P. ROESCH  1,800,407
STOKER
Filed Dec. 17, 1925  2 Sheets-Sheet 2

Inventor
Frank P. Roesch
By his Attorneys
Edwards, Sager + Power

Patented Apr. 14, 1931

1,800,407

UNITED STATES PATENT OFFICE

FRANK P. ROESCH, OF CHICAGO, ILLINOIS, ASSIGNOR TO STANDARD STOKER COMPANY, INCORPORATED, A CORPORATION OF DELAWARE

STOKER

Application filed December 17, 1925. Serial No. 75,911.

This invention relates to locomotive stokers that are adapted to convey coal from the locomotive tender forward to the locomotive fire box, there to be distributed over the fire, and its principal object is to provide an improved construction and arrangement of the stoker and its driving means.

In stokers of this character heretofore used, it has been customary to mount the stoker driving engine on the locomotive usually on the rear truck underneath the locomotive deck, and to provide a suitable driving connection between the engine and the rear end of the stoker conveyer which is positioned on the tender. The driving connection is a shaft having suitable universal connections therein to permit transmission of power during relative movement between the locomotive and its tender. Such an arrangement has the advantage that steam may be supplied to the engine through a relatively rigid supply pipe, in that the engine receives its steam supply from the locomotive. The advantages derived from a relatively rigid steam supply pipe, however, are, I find, more than overbalanced by the disadvantages caused not only by the expense of providing the mechanical connection between the stoker engine and the conveyer, but also by the disadvantage that a flexible connection such as must be employed will increase fluctuations in the power flow to the conveyer, as, for instance, when the locomotive and tender have any appreciable vertical movement therebetween. In my arrangement, I am enabled, by transferring the flexible characteristic from the power transmission system to the steam supply line, not only to eliminate a material part of this mechanical connection, but also to eliminate that part which has been the cause of increasing the fluctuations of power flow from the engine to the conveyer. Even though the necessity for a flexible connection has not been eliminated, yet the transfer of this flexible characteristic from one element to the other, in my arrangement, permits the elimination of one source of power fluctuation, for the steam flowing through the supply pipe will be substantially uniform irrespective of the degree of flexibility thereof. Hence it is seen that I have imposed a flexible characteristic upon an element which, in the prior art, was relatively rigid, and vice versa, but by so doing I have accomplished the results above mentioned, and which could not be had with the prior art arrangement.

More specifically in accordance with my invention, I mount the stoker driving engine on the tender preferably beneath the tender deck in advance of the water compartment. I also, preferably, employ a stoker wherein the coal is forced through a conduit from the coal bin on the tender to the point in the locomotive fire box above the level of the fire by means of a single horizontal conveyor screw located in the conduit, this screw being driven from a single point at its rear end. By employing this type of stoker, and by mounting the driving engine on the tender, I not only lessen the load on the journals of the rear truck, but I also am able to simplify the driving connection between the engine and conveyor screw. For example, I avoid the necessity of employing the driving connections extending between the locomotive and tender, which driving connections of necessity include one universal joint to allow for the lateral movement between the tender and the locomotive and which driving connections also must be longitudinally extensible to permit relative movement of the tender and locomotive toward, and away from one another. The stoker driving means is preferably a steam engine which is supplied with steam from the locomotive boiler by a pipe which extends from the locomotive to the tender and is provided with flexible joints of the usual standard type. This supply pipe may also be provided with a valve conveniently located in the locomotive cab, which valve controls the supply of steam to the stoker driving engine.

Other objects and advantages of my invention, will appear from the following description taken in connection with the accompanying drawing, wherein Fig. 1 is a fragmentary plan view of a locomotive and tender showing one form of my improved stoker and driving means.

Figure 2:
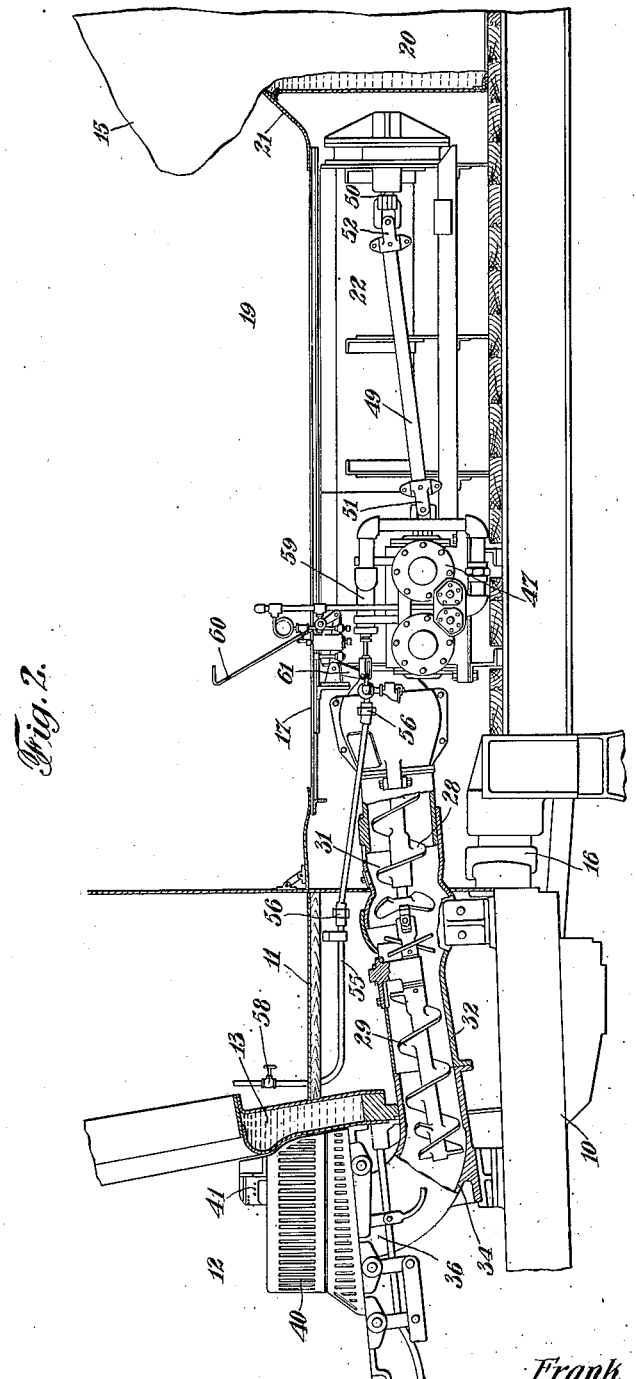

Fig. 2 is a side elevation, partly in section and partly broken away, of the structure shown in Fig. 1.

In the drawing, 10 represents a locomotive having a deck 11, a boiler fire box 12 at the rear of which is the usual water leg 13, and 15 represents the tender which is coupled to the locomotive by a gear 16, and which has a deck 17, coal bin 19 and a water tank 20, which embraces the rear portion and sides of the coal bin. The coal bin is formed with inclined sides 21 and at its bottom with a trough 22 in which rotates the rear section 23 of the stoker conveyor screw. A crusher 25 may be provided at the forward end of the conveyor screw section 23, and the conveyor screw is completed by two additional sections 28 and 29. Section 23 drives section 28 through a universal joint, not shown and section 28 drives section 29 through a universal joint not shown. Sections 28 and 29 are contained in housings 31 and 32, respectively, and these housings are provided with universal joints and a telescopic joint of the form illustrated, as is customary in stokers of this character.

The forward end of the housing 32 is provided with an elbow 34 located in the ash pan and the elbow 34 communicates with a rising core tube 36 which terminates in a discharge mouth 37 in the fire box 12. The section 29 of the conveyor screw terminates near or in the elbow 34 at a point which permits the conveyor screw to force the coal through the elbow without causing it to pack beneath the screw 29 or to block its easy or smooth flow around the elbow and through the unobstructed core tube 36 to the discharge mouth 37. 40 represents a protecting grate surrounding the core tube 36, and 41 represents a steam jet distributor head, having radial nozzles adapted to form steam jets for distributing the coal as it rises from the core tube 36 over the fire. The conveyor screw comprising sections 23, 28 and 29 and universal joints is driven from the rear end of section 23 by gears 45 and 46, these gears being driven from the engine 47 through shaft section 49 which is connected to the engine shaft by universal joint 51 and through shaft section 50, which is connected to shaft section 49 by universal joint 52. The shaft section 49 extends along the trough 22 between the trough and water tank 20, and the engine 47, preferably, is located in a compartment beneath the tender deck just forward of the water tank, where it is supported on the tender frame. Engine 47 is supplied with steam from the locomotive boiler by a pipe connection 55 which is provided with flexible joints 56 so as to allow for relative movement between the locomotive and tender. Supply of steam to the engine 47 may be controlled by a valve 58 conveniently located in the locomotive cab. 65 represents a reversing valve for the engine which is adapted to be operated preferably from the tender deck by a handle 60 which is connected to the reversing valve through a bell-crank lever 61.

I claim:—

The combination in a locomotive tender, having a base; a body portion; and partition plates separating the fuel section of the tender from the water section thereof, the fuel section being designed to receive stoker mechanism, the forward end of the tender having a compartment at one side of the fuel section for the engine of the stoker mechanism.

FRANK P. ROESCH.